United States Patent
Lopez

[15] 3,682,344
[45] Aug. 8, 1972

[54] NURSING BOTTLE FORMED BY A HOUSING AND A RUBBER NIPPLE

[72] Inventor: Arnelson N. Lopez, Louella, No. 301 Avellaneda, Buenos Aires, Argentina

[22] Filed: Aug. 17, 1970

[21] Appl. No.: 63,502

[52] U.S. Cl. ............215/11 R, 73/343 B, 128/252, 215/6, 215/7, 215/11 A
[51] Int. Cl. ..................A61j 9/00, A61j 9/02
[58] Field of Search .........215/6, 7, 11 A, 11 R; 73/343 B; 128/252; 99/171 ND; 222/142.5

[56] References Cited

UNITED STATES PATENTS

| | | | |
|---|---|---|---|
| 1,510,571 | 10/1924 | Ware | 128/252 |
| 197,156 | 11/1877 | Meyer | 73/343 B |
| 2,319,101 | 5/1943 | Anderson | 73/343 B |

FOREIGN PATENTS OR APPLICATIONS

| | | | |
|---|---|---|---|
| 11,968 | 10/1885 | Great Britain | 73/343 B |
| 1,024,618 | 4/1953 | France | 222/142.5 |
| 22,926 | 10/1902 | Great Britain | 73/343 B |
| 1,431,819 | 2/1966 | France | 215/11 A |
| 62,215 | 6/1953 | France | 215/11 A |

Primary Examiner—Joseph R. Leclair
Assistant Examiner—Stephen Marcus
Attorney—Lerner, David & Littenberg

[57] ABSTRACT

A nursing bottle formed by a container of milk and a rubber nipple in the ordinary configurations except that said rubber nipple is provided with a small chamber to receive a material other than milk and to supply said material for baby together with said milk in the container.

7 Claims, 4 Drawing Figures

PATENTED AUG 8 1972  3,682,344

NURSING BOTTLE FORMED BY A HOUSING AND A RUBBER NIPPLE

The present invention relates to a nursing bottle formed by a housing and a rubber nipple.

Further the present invention intends to modify the ordinary constructions of the nursing bottle which is to supply a body with the vital element of the baby, i.e. milk.

Still further, in the present invention, the housing of the nursing bottle is provided with a thermometer to measure the temperature of the liquid contained therein and the nipple of the bottle is provided with a chamber to contain some medicine etc. other than milk.

The thermometric device in the housing has the object of determining the temperature of the liquid, milk contained therein, which is not normally observed in the ordinary type bottles used for such purposes. In this way, the qualitative valuation of the temperature of the milk will be avoided, for example in the ordinary ways, the temperature of the milk is measured by pouring it over the skin or putting the rubber nipple on the mouth. These methods of measuring temperature are inaccurate, in addition to that they are unhygienic.

Therefore, one of the characteristic feature of the present invention is that the temperature of the milk can be measured easily, quickly, accurately and hygienically. Another characteristic feature of the present invention is that the rubber nipple is provided with a chamber to contain some materials other than milk, which has never been found in the ordinary type nursing bottles.

By the provision of said chamber for the nipple, several solutions or suspensions of vitamins, aspirin, cough medicines, or other medicines, or sweetening materials can be supplied together with milk, which have been difficult, especially in the case of baby.

The invention will be better understood from the following description taken in connection with the accompanying drawings in which.

Figure 1:
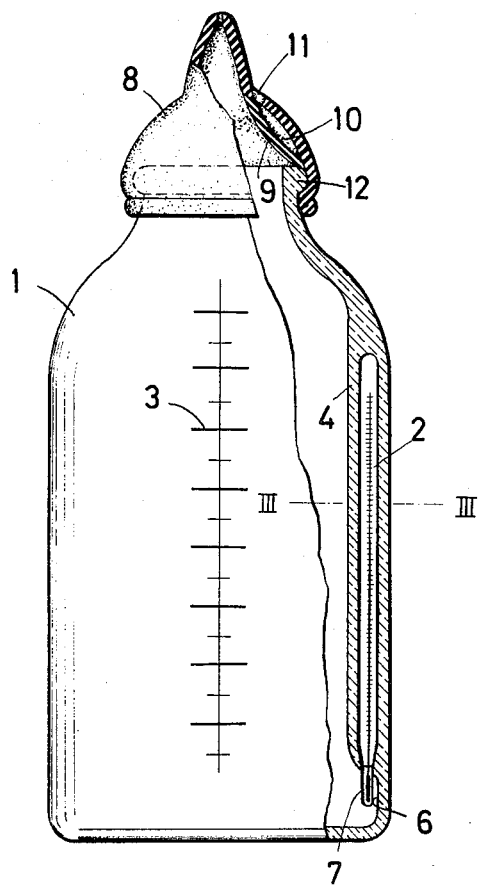
FIG. 1 is a partially sectional front elevation of the nursing bottle of the present invention.
Figure 3:
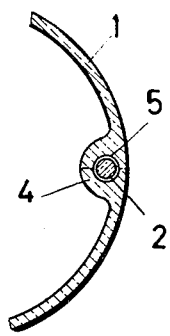
FIG. 3 is an enlarged sectional horizontal view taken along the line III — III in FIG. 1.
Figure 2:
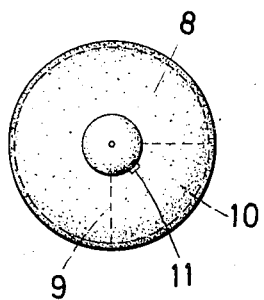
FIG. 2 is a plan view of the nipple of the bottle.

Now, referring to the accompanying drawings, in FIG. 1, the container 1 made of transparent or translucent material such as glass, or synthetic plastics is cylindrical with two lateral graduations, one graduation 3 is used for measuring the liquid contained in the bottle, and another graduation (not shown) is used for the thermometer 2. Of course, the latter graduation can be omitted as the thermometer 2 has its graduation on its side wall, usually. Said thermometer 2 can be applied in a bore 5 at the thickened portion 4 in the wall of said container 1, as shown in FIGS. 1 and 3, and the thickening can be effected in each of the half sides corresponding to the container in such way that when the thermometer is deposited on uniting, it remains secured. In the lower portion of the thickened wall 4, a concave 6 is made, allowing the free end of the thermometer to protrude at the bottom of the container 1 from the thickened portion 4. Around the thermometer bulb 7, there may be remained a small space to allow the liquid in the bottle to pass through.

The rubber nipple 8 that has the characteristics common to the same is added with a chamber 10 by a wall portion 9 that has the object and purpose of carring the aforementioned sweets, medicines, syrup, aspirins etc. The same has the practical purpose of making stubborn children assimilate their medicine without inconvenience (psychological apprehesion). It can also be used in the case the child rejects the rubber dummy through lack of gustatory assimilation. The chamber can carry sweets favoring the above-mentioned affinity. In the inner part of the rubber nipple 8, a wall 9 of the identical material is applied, that presents a triangular or fan shape. The base is related with the contact border 12 (mouth of the container). In the cross section may be observed the deviated conical form of the cavity. On its outer wall, the same has an orifice 11 for the hollow of feeding and discharge. Once the liquid is fed into said chamber 10, while milk is contained in the container 1, the nursing bottle is placed in a slanted position and the outer wall of the rubber nipple come into contact with the mouth of the baby, thereby the liquid in the small chamber 10 is supplied to baby simultaneously with the milk in the container.

Figure 4:
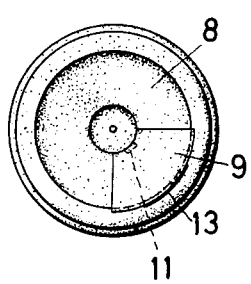
FIG. 4 is a bottom view of another embodiment of the nipple of the present invention.

In FIG. 4, another embodiment of an nipple of the present invention is shown. The nipple 8 is formed basically in the same shape of the one as shown in FIG. 1, in which a feeding slot 13 is provided as well as the small chamber 10 and the orifice 11. This feeding slot 13 is closed in the normal state by the elasticity of rubber used, and it can be opened by a finger pressure in the direction along the length of the slot 13. In this embodiment, washing or pasteurization of the nipple can be carried out easily as compared with the former embodiment because the feeding slot facilitate the contact between the inner surface of the chamber and the washing medium. As the feeding slot 13 is provided in the inside of the nipple, the feeding slot can be tightly closed when the nipple is fixed to the mouth portion of the container 1, owing to the elasticity of rubber and the pressure of close fixing.

While a few embodiments of the invention have been illustrated and described in detail, it is particularly understood that invention is not limited thereto or thereby.

What is claimed is:

1. A nursing bottle formed by a container and a nipple;
    said nipple having an outside surface and an inside surface;
    said nipple further including a wall the edges of which are applied to said inside surface of said nipple and the central portion of which is spaced from said inside surface of said nipple to define a chamber;
    said nipple including an orifice which communicates with said chamber.

2. The nursing bottle of claim 1 wherein said wall is of generally triangular configuration; and
    one of said edges forms the base of said triangular configuration.

3. The nursing bottle of claim 2 wherein a normally closed slot is provided along said base.

4. The nursing bottle of claim 3 wherein said container terminates at its upper end thereof in a mouth portion; and said mouth portion aids in maintaining said slot in its closed position.

5. A nipple; said nipple having an outside surface and an inside surface;

said nipple further including a wall the edges of which are applied to said inside surface of said nipple and the central portion of which is spaced from said inside surface of said nipple to define a chamber;

said nipple including an orifice which communicates with said chamber.

6. The nipple of claim 5 wherein said wall is of generally triangular configuration; and one of said edges forms the base of said triangular configuration.

7. The nipple of claim 6 wherein a normally closed slot is provided along said base.

* * * * *